Jan. 28, 1958     H. E. SLOAN     2,821,404
COLLET CHUCK WITH INTERNAL WORK STOP PROVISIONS
Filed Oct. 21, 1953     5 Sheets-Sheet 1

Inventor:
Harry E. Sloan
By: Steward & Springh
Attorneys.

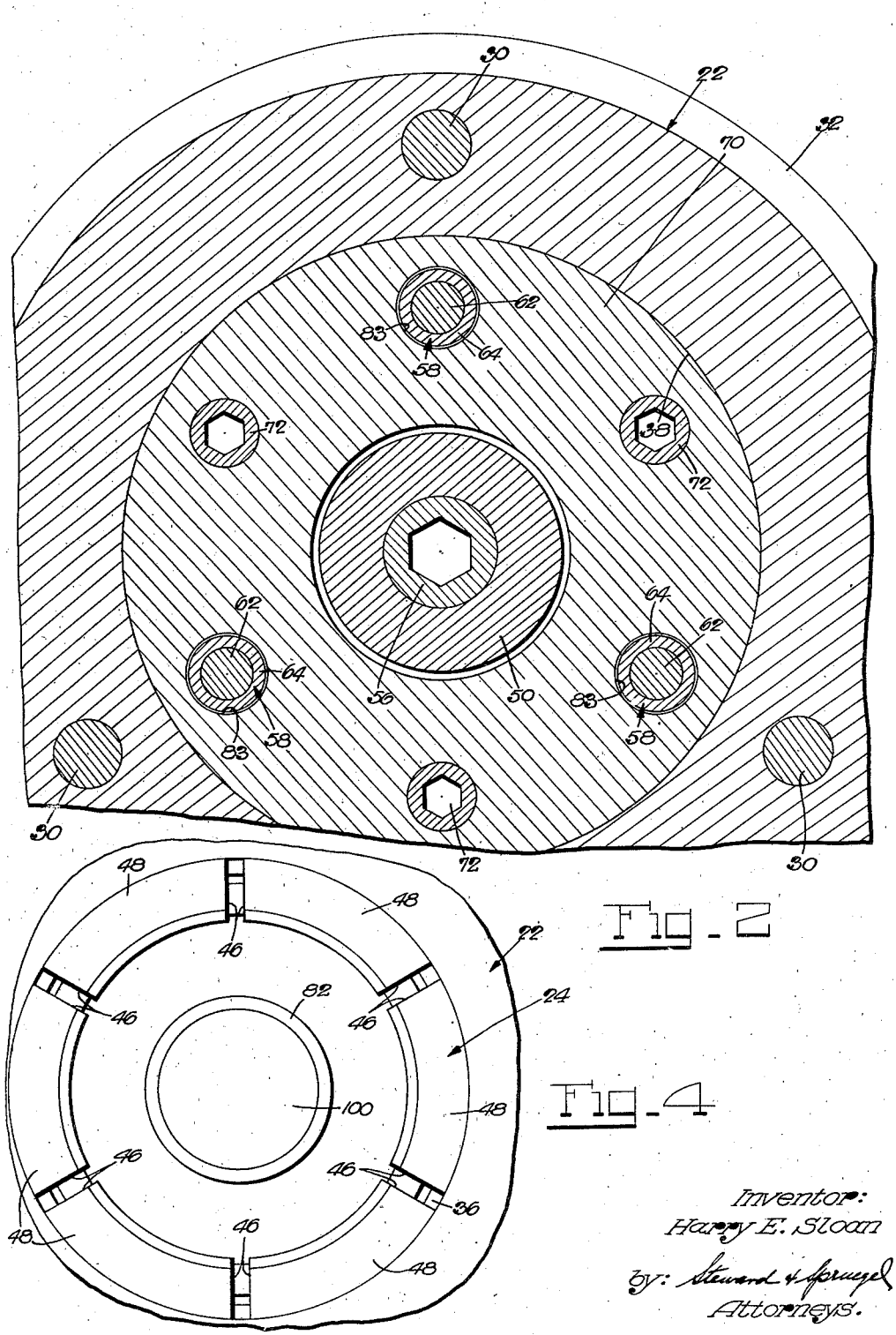

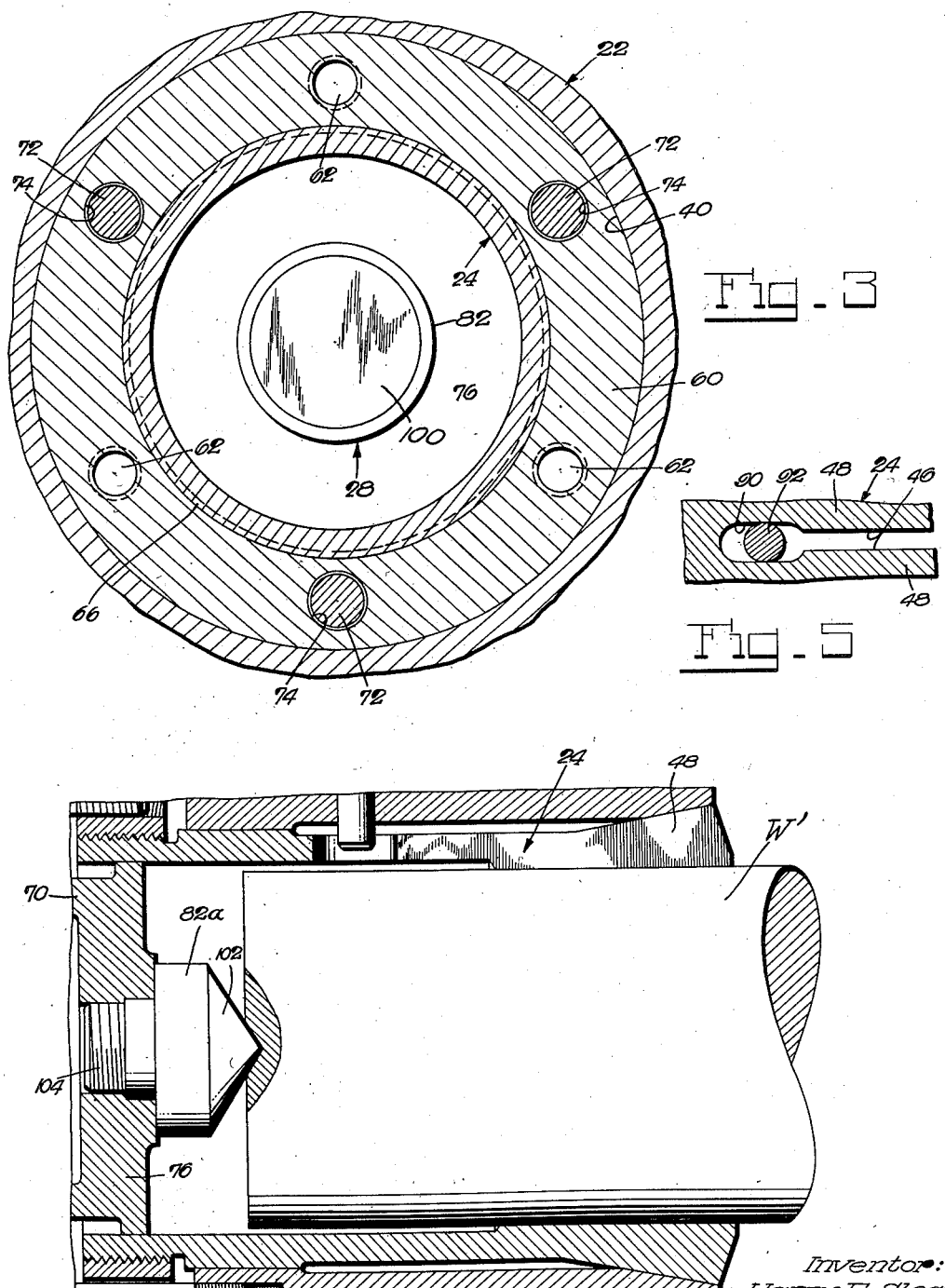

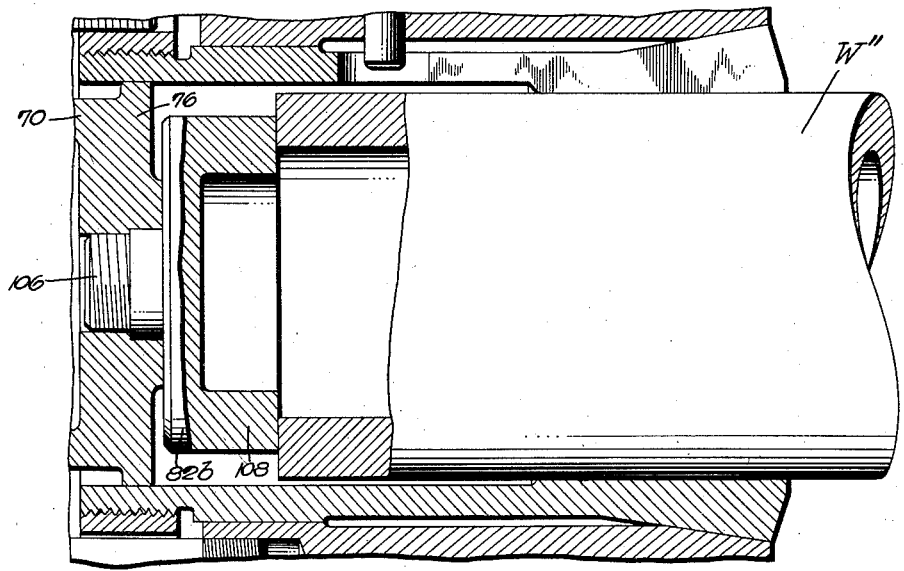
Fig_7
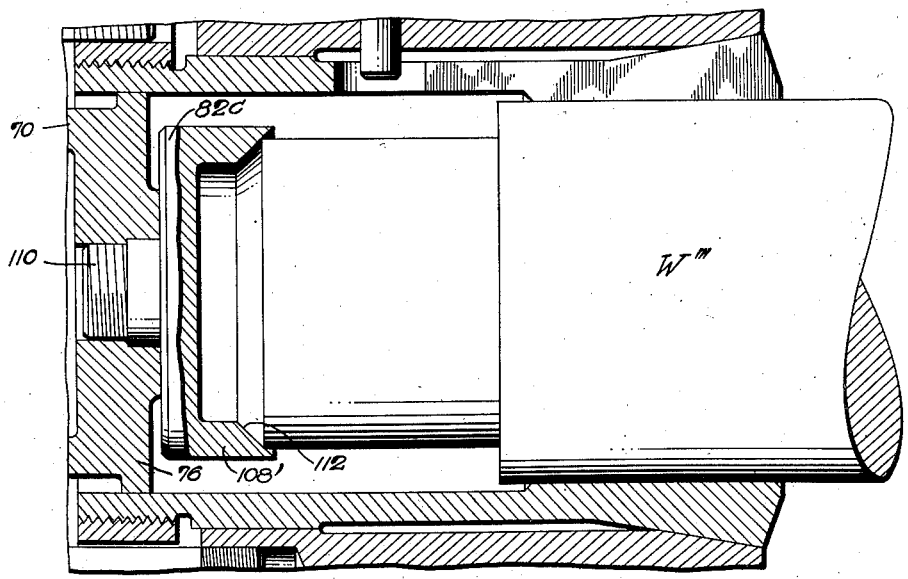
Fig_8

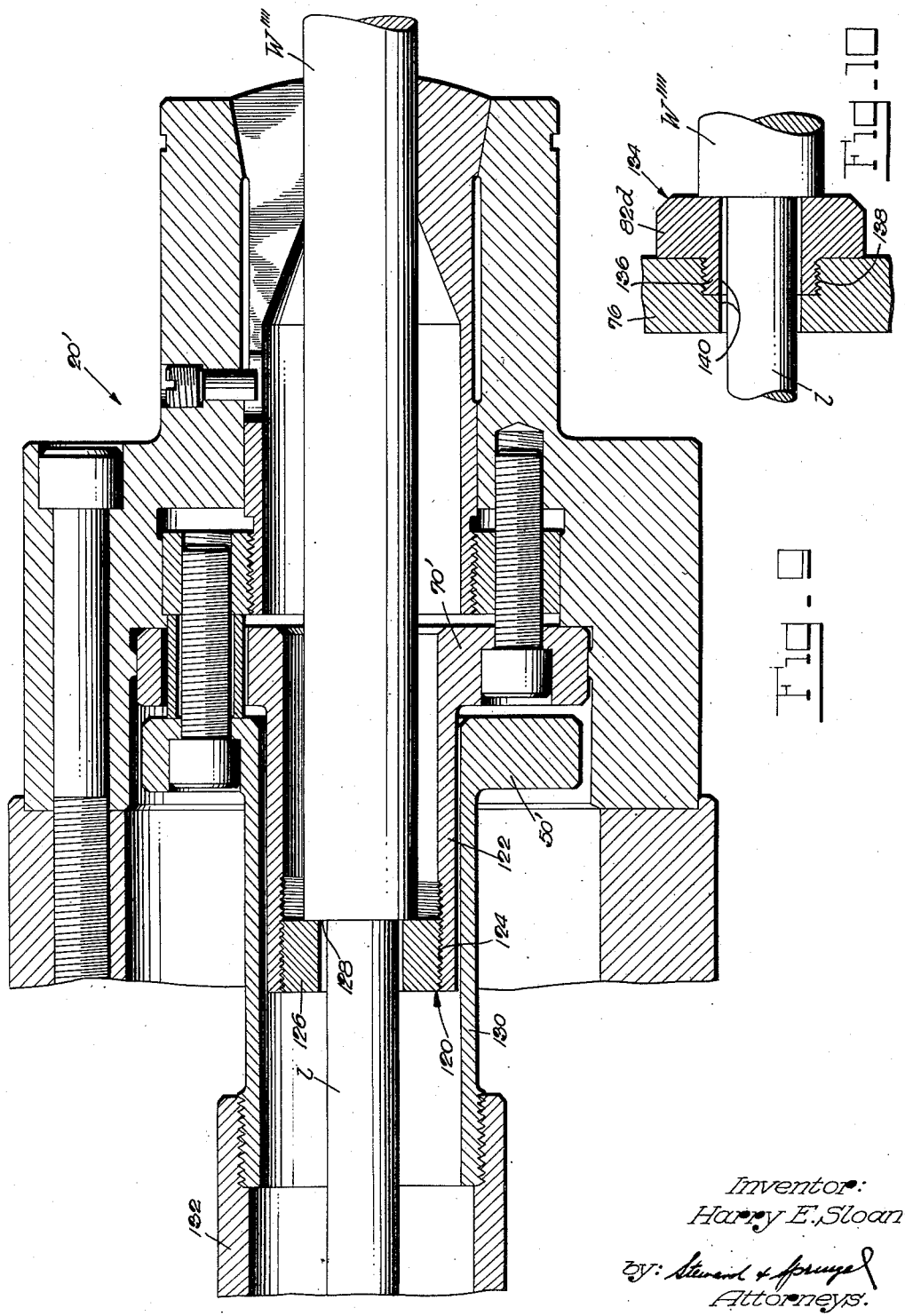

United States Patent Office 2,821,404
Patented Jan. 28, 1958

2,821,404

COLLET CHUCK WITH INTERNAL WORK STOP PROVISIONS

Harry E. Sloan, Hartford, Conn., assignor to The Cushman Chuck Company, Hartford, Conn., a corporation of Connecticut Application October 21, 1953, Serial No. 387,342

11 Claims. (Cl. 279—51)

This invention relates generally to collet chucks, and more particularly to collect chucks of the type having internal work stops.

It is an object of the present invention to provide a collet chuck of this type which is rugged in construction and accurate and reliable in operation, and which is made up of a minimum number of simple parts that may readily be assembled and, if necessary, as readily disassembled.

It is another object of the present invention to provide a collet chuck of this type in which the work stop is provided on a transverse partition in the interior of the chuck body between the collet and its operating mechanism, and parts of the operating mechanism extend through this partition to the collet and are connectible with or detachable from the latter from either end of the chuck, thereby not only facilitating the assembly of the chuck parts, but also permitting ready temporary removal of the collet from the chuck body or its replacement with another collet while the chuck is mounted on a lathe or other machine tool.

It is a further object of the present invention to provide a collet chuck of this type of which the afore-mentioned parts of the operating mechanism are releasably connected with a non-rotatable ring in the chuck body in which the inner end of the collet is threadedly received and which is slidable with the latter, thereby not only permitting ready connection of the collet with and disconnection from its operating mechanism from the front end of the chuck, but also permitting axial adjustment of the collet in the chuck body so that the same may grip work of different cross-sectional dimensions.

Another object of the present invention is to provide a collet chuck of this type of which the collet may in a predetermined number of angular positions in the chuck body be releasably splined to the latter, so that the collet may in any one of a large number of axially adjusted positions be locked against accidental or unauthorized rotation while being free to slide in the chuck body for work gripping and releasing purposes.

A further object of the present invention is to provide a collet chuck of this type of which the operating mechanism for the collet is removable from the rear or mounting end of the chuck body, and the aforementioned partition is a separate disc or spider drawn against an annular shoulder in the interior of the chuck body by bolts which are accessible from the rear end of the chuck body after the operating mechanism for the collet has been removed therefrom, thereby not only facilitating the installation of the work stop provisions in the chuck, but also permitting the removal of the same for operation of the chuck without these provisions if this be desirable.

It is another object of the present invention to provide a collet chuck of this type in which the work stop may readily be replaced with another stop or stops for different work without requiring removal of the chuck from a lathe or other machine tool or temporary disassembly of any of the parts of the chuck.

Another object of the present invention is to provide a collet chuck of this type in which the work stop may readily be replaced with a work-center for more secure support of certain work in accurately located position in the collet.

Further objects and advantages will appear to those skilled in the art from the following, considered in conjunction with the accompanying drawings.

In the accompanying drawings, in which certain modes of carrying out the present invention are shown for illustrative purposes:

Fig. 1 is a longitudinal section through a collet chuck embodying the present invention;

Figs. 2 and 3 are fragmentary cross-sections through the collet chuck as taken on the lines 2—2 and 3—3, respectively, of Fig. 1;

Fig. 4 is a fragmentary front view of the collet chuck as seen in the direction of the arrow 4 in Fig. 1;

Fig. 5 is a fragmentary section taken on the line 5—5 of Fig. 1;

Figs. 6, 7 and 8 are fragmentary longitudinal sections through collect chucks having various modified work stop provisions, respectively;

Fig. 9 is a longitudinal section through a collet chuck of modified form; and

Fig. 10 is a fragmentary section through still another modified work stop provision in a collet chuck.

Figure 1:
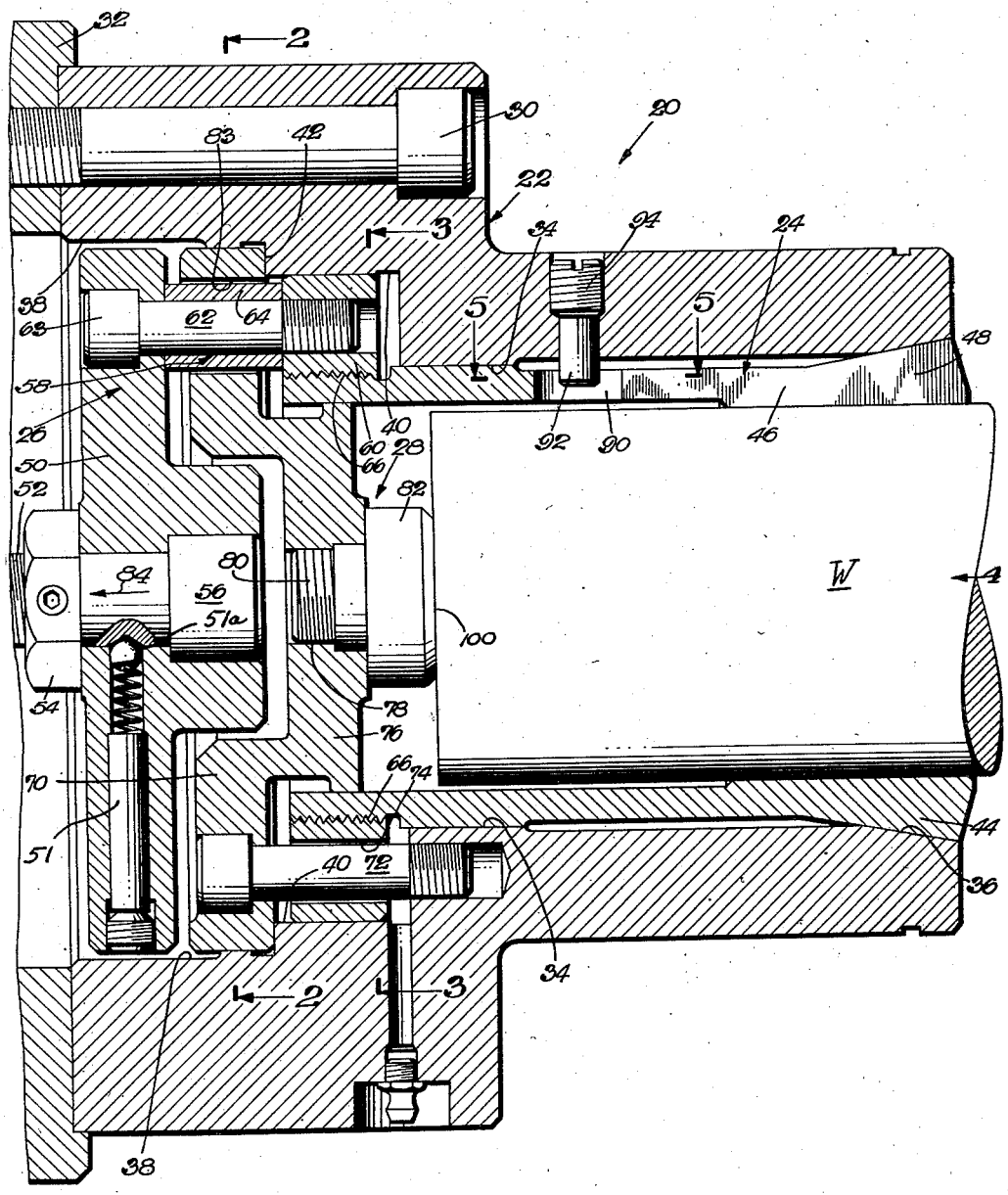

Referring to the drawings, and more particularly to Fig. 1 thereof, the reference numeral 20 designates a collet chuck which comprises a chuck body 22, an internal sleeve-type collet 24, collet-operating mechanism 26, and in this instance also internal work stop provisions 28. The rear of the chuck body may conveniently be bolted at 30 to the head 32 of the power spindle of a lathe or other machine tool (Figs. 1 and 2).

The chuck body 22 is provided with a central cylindrical aperture 34 of which a front length is tapered as at 36. The rear end of the chuck body 22 is provided with an annular recess 38 and a continuing recess 40 which extends to the inner end of the aperture 34. Both recesses 38 and 40 are in this instance of larger diameter than the aperture 34, and recess 38 is of larger diameter than recess 40 to provide between them an annular shoulder 42 facing toward the rear of the chuck body.

The collet 24 is in the form of a cylindrical sleeve having an externally tapered end length 44. The collet 24 is provided throughout a substantial part of its length with a number of equiangularly spaced longitudinal slots 46, in this instance six, which define collet jaws 48 (Figs. 1 and 4). The collet 24 is slidable and also rotatable in the aperture 34 in the chuck body 22, and its externally tapered jaws 48 will cooperate with the tapered end 36 of the aperture 34 in gripping and releasing work W on sliding the collet in opposite directions in the chuck body 22.

The collet-operating mechanism comprises, in the present instance, an operating head or disc 50 which through bolt 52 may be operatively connected with a reciprocable draw bar (not shown) in the hollow power spindle of the machine tool on which the chuck is mounted. A lock nut 54 on the bolt 52 serves to draw the operating disc 50 firmly against the head 56 of the bolt. A ball and spring detent 51 is provided in disk 50, and a cooperating depression 51a is formed in bolt 52 to prevent accidental turning of the bolt when the nut is tightened. For reasons which will appear obvious hereinafter, the operating disc 50, which is located in the annular recess 38 in the chuck body 22, is connected with the collet 24 through intermediation of a plurality of links 58 and an internally threaded ring 60 which is slidable on its outer periphery in the annular recess 40 in the chuck body (Fig. 1). In the present instance, there are three equiangularly spaced links 58 (Fig. 2), and each link comprises a bolt 62 received with its head 63 in the operating disc 50 (Fig. 1), and with its shank threaded into the ring 60, and a sleeve 64 which surrounds the bolt 62 and is interposed between the disc 50 and ring 60 to hold them in spaced relationship. The ring 60 is threadedly received at 66 by the inner end of the collet 24 which extends into the recess 40 in the chuck body 22. Accordingly, the collet 24 will be moved axially in the chuck body for work gripping and releasing purposes when the hereinbefore-mentioned draw bar is reciprocated in opposite directions, as will be readily understood.

The internal work stop provisions 28 comprise, in the present instance, a partition member or disc 70 which is drawn against the annular shoulder 42 in the chuck body 22 by a plurality of bolts 72 which are threadedly received in the chuck body and extend through apertures 74 in the ring 60, preferably with only slight clearance (Fig. 1). The disc 70 is in this instance provided with a forward extension 76 which projects into the adjacent end of the collet 24 with a sliding fit to provide for guidance of the latter in the recess 40 in the chuck body. The forward projection 76 of the disc 70 is in its center provided with a tapped hole 78 for the reception of the threaded shank 80 of a work stop 82 which is in the path of the work W introduced into the collet 24 and limits the extent of its insertion therein. Since the disc 70 is interposed between the operating disc 50 and ring 60 (Fig. 1), the before-mentioned links 58 extend through apertures 83 in the disc 70, preferably with little clearance.

When the collet 24 is open, work W may be inserted therein until the same abuts the stop 82. The jaws 48 of the collet 24 are thereupon closed into firm gripping engagement with the inserted work W by causing movement of the before-mentioned draw bar in the direction of the arrow 84 in Fig. 1. Motion of the draw bar in this direction is transmitted to the collet 24 through intermediation of the operating disc 50, links 58 and ring 60, and motion of the collet in this direction will result in cooperation between the tapered end 36 of the aperture 34 in the chuck body 22 and the tapered collet jaws 48 in forcing the latter into gripping engagement with the inserted work W. The gradually increasing gripping forces exerted by the jaws 48 of the collet 24 on the work W on movement of the collet in the direction of the arrow 84 on Fig. 1 have components in the same direction, with the result that the work W is drawn even more firmly against the stop 82 when the collet grips the work. To release the work W from the jaws 48 of the collet 24, the latter is moved slightly in the direction opposite to the arrow 84 in Fig. 1 by the collet-operating mechanism 26, as will be readily understood.

Since the operating disc 50 and connected ring 60 are held against independent rotation in the chuck body 22, the collet 24 may, on simple rotation in the chuck body, be axially adjusted in the latter, initially for gripping work of a certain diameter, or subsequently for gripping work of slightly different diameters. This is due to the threaded engagement of the inner end of the collet 24 with the ring 60. To prevent accidental or unauthorized rotation of the collet 24 from any of its axially adjusted positions, the same is provided with a plurality of circumferentially spaced longitudinal slots 90 with any one of which may register the shank 92 of a stud 94 which is threaded into the chuck body 22 from the outside thereof (Fig. 1). Each of the slots 90 may conveniently be provided at the inner end of each of the jaw-forming slots 46 in the collet 24 (see also Fig. 5). Accordingly, after retracting the stud 94 with its shank 92 from the collet 24 and turning the latter relative to the ring 60 to achieve a desired axial adjustment of the collet, the latter will require only inconsequential further rotation, if any, to bring the nearest slot 90 therein into alignment with the shank 92 of the stud 94, whereupon the latter may be reapplied to lock the collet against rotation.

The instant collet chuck is advantageous in several respects. Thus, the adjustability of the collet 24 on mere rotation of the same relative to the ring 60, even while the chuck is mounted on a lathe or other machine tool, greatly facilitates the task of adapting the collet initially to work of a certain diameter, or subsequently to work of slightly different diameters. The provision of the stud 94 in the chuck body 22 and of the slots 90 in the collet 24 permits quick interlock of the latter in any adjusted position with the chuck body, and permits equally quick release of the collet from interlock with the chuck body for adjustment of the former. The provision of the recesses 40 and 38 of progressively larger diameters in the rear of the chuck body facilitates the assembly of the parts of the chuck, and also facilitates their disassembly if necessary. Thus, the collet 24 may be introduced in the chuck body 22 from the front thereof, and the remaining parts of the chuck may conveniently be assembled in the chuck body from the rear thereof. The provision of the forward extension 76 on the disc 70 into the interior of the collet 24 not only permits the location of the work stop 82 within the confines of the collet, but provides additional guidance for the collet, especially at its inner or rear end which projects from the collet-receiving aperture 34 in the chuck body into the larger recess 40 in the latter. The threaded connection of the collet 24 with the adjacent part of the collet-operating mechanism 26, namely the ring 60, also permits quick and convenient removal of the collet from the chuck body and its replacement with another collet, if necessary, without requiring the disassembly of any other parts of the chuck or even removal of the chuck from the lathe or machine tool on which the same is mounted.

While the work stop 82 in Figs. 1 and 3 is in the form of a disc having a flat front or stop surface 100 for solid cylindrical work W, Fig. 6 shows a modified form of a stop 82a of which the front face is conical as at 102 to serve also as a center for solid cylindrical work W'. The collet chuck in which the combined work stop and center 82a is provided may in all respects be like the collet chuck of Fig. 1, and the combined work stop and center 82a may have a threaded shank 104 for its releasable mounting in the forward projection 76 on the disc 70 in the chuck body. The combined work stop and center 82a cooperates with the jaws 48 of the collet 24 in holding gripped work, and especially work of considerable length, accurately centered in the chuck while being operated upon.

Fig. 7 shows another modified work stop 82b in a collet chuck which also may in all respects be like that shown in Fig. 1. Thus, the modified work stop 82b may have a threaded shank 106 for its releasable mounting in the forward projection 76 on the disc 70 in the chuck body. The instant modified work stop 82b is cup-shaped and has a rim 108 which serves to stop hollow work W" to be gripped by the collet 24.

Fig. 8 shows another modified work stop 82c in a collet chuck which also may in all respects be like that shown in Fig. 1. Thus, the instant modified work stop 82c may, like the previous work stops, have a threaded shank 110 for its releasable mounting in the forward projection 76 on the disc 70 in the chuck body. This modified work stop is cup-shaped like that shown in Fig. 7, but its rim 108' has an inner tapered surface 112 for externally centering cylindrical work W''' in the collet 24.

Fig. 9 shows a collet chuck 20' which, except for insignificant different relative dimensions of its parts and a few other distinctions noted hereinafter, is like the collet chuck 20 shown in Fig. 1, but distinguishes significantly from the latter by having stop provisions 120 for work W'''' of which a cross-sectionally reduced length *l* is permitted to extend beyond the rear of the chuck. In the present instance, the disc 70' is provided with a rearwardly projecting tubular extension 122 which threadedly receives at 124 a work stop 126 which is in the form of a ring adapted to be engaged by a shoulder 128 on the work W''''' and permit the extension therethrough of the cross-sectionally reduced length *l* of the work. To accommodate the cross-sectionally reduced length *l* of the work W''''', the operating disc 50' is in this instance provided with a central tubular rearward extension 130 which is operatively connected, preferably threadedly, with a draw bar 132 that is tubular in this instance. The threaded mounting 124 of the work stop in the tubular disc extension 122 permits ready adjustment of the former axially of the chuck on merely turning the work stop 126.

While the work stop provisions 120 in the chuck 20' of Fig. 9 permit the extension of the cross-sectionally non-reduced part of the work W''''' beyond the operating disc 50', Fig. 10 shows another modified work stop arrangement 134 which stops the cross-sectionally non-reduced part of work W''''' within the confines of the collet. Thus, a work stop 82*d* has a shank 136 which is threadedly received in a recess 138 in the forward extension 76 of a disc 70 which may be like or similar to that shown in Fig. 1 and be incorporated in a chuck, like or similar to that shown in Fig. 9 insofar as the rearward tubular extension 130 of the operating disc 50' and its connection with the tubular draw bar 132 is concerned. The instant disc extension 76 and work stop 82*d* are apertured at 140 (Fig. 10) for the extension therethrough of the cross-sectionally reduced length *l* of the work W'''''.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

What is claimed is:

1. A collet chuck, comprising a chuck body having a longitudinal axis and aligned front and rear recesses separated by a removable apertured internal partition of which said front recess is tapered at its open end; means securing the partition in said chuck body; a sleeve-type collet contained wholly in said front recess and being axially slidable and rotatable therein, said collet having externally tapered jaws in one end to cooperate with said tapered recess end in gripping and releasing work; operating mechanism for sliding said collet, said mechanism including a part axially movable in said rear recess and a lengthwise adjustable link connection between said part and collet and extending through the aperture in said partition; and a work stop on said partition in the path of work introduced into said collet.

2. A collet chuck, comprising a chuck body having a central aperture tapered at one end and a recess of larger cross-sectional area than said aperture continuous with the latter at its other end to form an internal shoulder in said body; a sleeve-type collet slidable in said aperture and having externally tapered jaws in one end to cooperate with said tapered aperture end in gripping and releasing work; an apertured member in said recess seated against said shoulder and secured to said chuck body and having a work stop in the path of work introduced into said collet; and operating mechanism for sliding said collet, said mechanism including a movable part in said recess and a link rigidly connecting said part and collet and extending through the aperture in said member.

3. A collet chuck, comprising a chuck body having a longitudinal axis and aligned front and rear recesses separated by a removable apertured internal partition of which said front recess is cylindrical and tapered at its open end; means securing the partition in said chuck body; a sleeve-type collet slidable and rotatable in said front recess and having externally tapered jaws in one end to cooperate with said tapered recess end in gripping and releasing work; a ring in said front recess threadedly connected with the other end of said collet and slidable with the latter; operating mechanism for sliding said collet, said mechanism including a part in said rear recess non-rotatable relative to said body but movable axially thereof, and a link rigidly connecting said part and ring and extending through the aperture in said partition; and a work stop on said partition in the path of work introduced into said collet.

4. A collet chuck as set forth in claim 3, further comprising cooperating means on said body and collet for releasably splining the latter in different predetermined angular positions to said body.

5. A collet chuck as set forth in claim 3, in which said collet is provided with a plurality of angularly spaced longitudinal slots, and there is further provided a stud threaded in said body from the outside thereof and having a shank registerable with any aligned slot in said collet.

6. A collet chuck as set forth in claim 3, in which said partition has a portion projecting into said collet and having said work stop within the latter.

7. A collet chuck as set forth in claim 3, in which said partition has a cup-shaped extension into said rear recess provided with a bottom, and said work stop is on said bottom.

8. A collet chuck as set forth in claim 3, in which said link is formed by a bolt connecting said part and ring, and a spacer sleeve surrounding said bolt and interposed between said part and ring and extending through the aperture in said partition.

9. A collet chuck, comprising a chuck body having a cylindrical aperture extending to one end of said body and being there tapered, and first and second recesses of which said second recess extends to the other end of said body, and said first recess is continuous with and intermediate said second recess and aperture and has a cross-sectional area which is larger than that of said aperture and smaller than that of said second recess to form a shoulder between said recesses; a sleeve-type collet slidable and rotatable in said aperture, said collet being externally threaded at one end and having externally tapered jaws in its other end to cooperate with said tapered aperture end in gripping and releasing work; an internally threaded ring in said first recess threadedly connected with said one end of the collet and slidable with the latter; an apertured member in said second recess seated against said shoulder and secured to said body and having a work stop in the path of work introduced into said collet; and operating mechanism for sliding said collet, said mechanism including a part in said second recess non-rotatable relative to said body but movable axially thereof, and a link rigidly connecting said part and ring and extending through the aperture in said member.

10. A collet chuck as set forth in claim 9, further comprising cooperating means on said body and collet for releasably splining the latter in different predetermined angular positions to said body.

11. A collet chuck as set forth in claim 9, in which said member has a cylindrical portion projecting into said collet and having a sliding fit therewith, and said work stop is provided on said projecting portion.

References Cited in the file of this patent

UNITED STATES PATENTS

| 1,188,667 | Lymburner | June 27, 1916 |
| 2,360,001 | LeTourneau | Oct. 10, 1944 |
| 2,389,633 | Odom et al. | Nov. 27, 1945 |
| 2,396,521 | Mead | Mar. 12, 1946 |
| 2,461,292 | Mead | Feb. 8, 1949 |
| 2,515,289 | Bergmann | July 18, 1950 |
| 2,572,890 | Serafin | Oct. 30, 1951 |
| 2,704,671 | Abramoska et al. | Mar. 22, 1955 |

FOREIGN PATENTS

| 601,190 | Great Britain | Apr. 29, 1948 |